United States Patent [19]

Stoof

[11] Patent Number: 4,939,968
[45] Date of Patent: Jul. 10, 1990

[54] GLASS CUTTING APPARATUS

[76] Inventor: Robert E. Stoof, 3714 41st Ave. S.W., Seattle, Wash. 98116

[21] Appl. No.: 228,706

[22] Filed: Aug. 4, 1988

[51] Int. Cl.⁵ .............................................. B26D 3/08
[52] U.S. Cl. ...................................... 83/886; 83/466; 83/468; 83/565; 83/879; 83/882; 269/303; 269/315; 269/900
[58] Field of Search ................... 83/62, 886, 565, 466, 83/468, 876, 879, 880, 886, 882, 881, 574, 522.1, 745, 743; 33/460, 452, 426, 441, 23.04; 269/37, 304, 45, 219, 900, 243, 901, 902, 315, 303

[56] References Cited

U.S. PATENT DOCUMENTS

| | | | |
|---|---|---|---|
| 858,913 | 7/1907 | Sauer | 33/460 |
| 876,102 | 1/1908 | Sibley | 83/880 |
| 3,321,201 | 5/1967 | Brewster | 269/304 |
| 3,344,819 | 10/1967 | Mitchell | 83/522 |
| 4,497,477 | 2/1985 | Abel | 269/303 |
| 4,685,366 | 8/1987 | Beder | 83/879 |

FOREIGN PATENT DOCUMENTS 223758  10/1962  Austria .................................. 83/886

Primary Examiner—Hien H. Phan
Assistant Examiner—Tom Hamill, Jr.
Attorney, Agent, or Firm—Hughes & Multer

[57] ABSTRACT

Glass cutting apparatus which includes a base with a fixed, glass positioning fence along one edge thereof and a removable, pivotable glass cutter guide which can be locked to the base at a selected angle relative to the fixed fence, allowing glass to be scored at any selected angle with respect to the fence. A variety of accessories allow the glass being worked to be securely positioned on the base; one of these is a removable fence against which the glass may be positioned instead of against the fixed fence. A holder for a glass cutter which is slidable along and then fixable to the pivotable glass cutter guide allows the system to be employed to cut arcs as well as straight lines. Optionally, the system may be employed with yet another accessory which allows the center of an arc being cut to be shifted to any selected location on the base of that system.

27 Claims, 11 Drawing Sheets

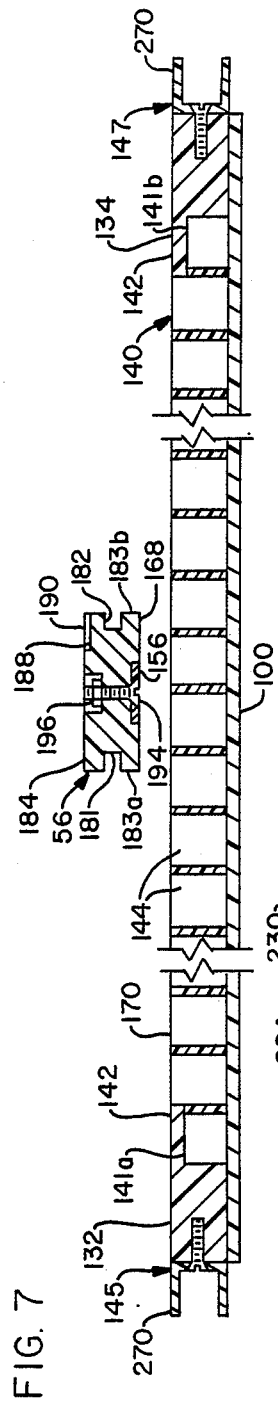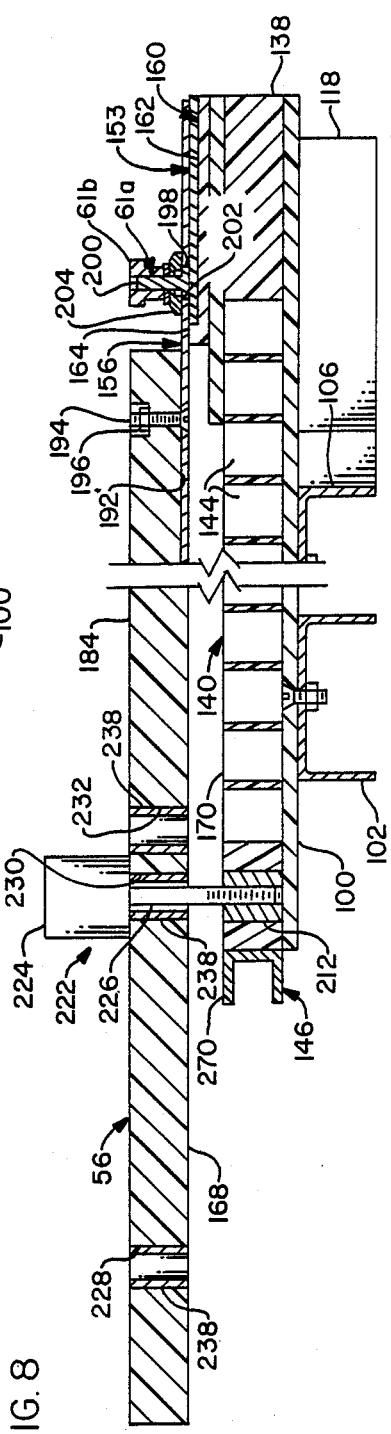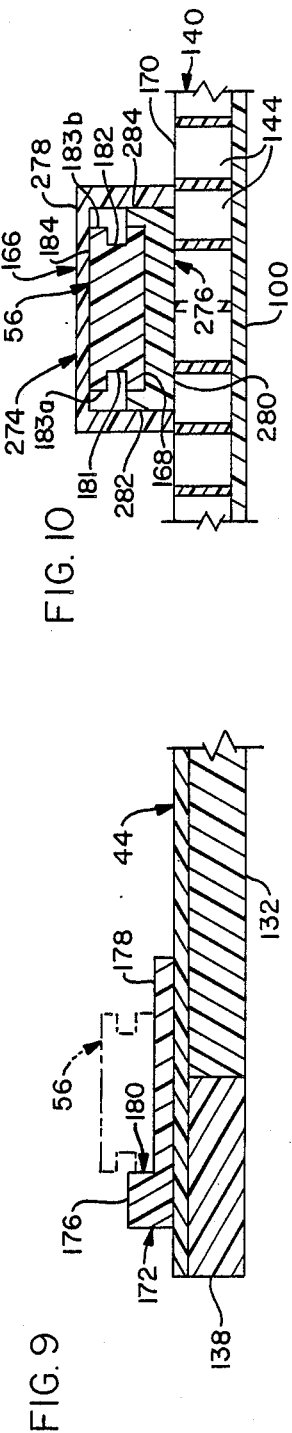

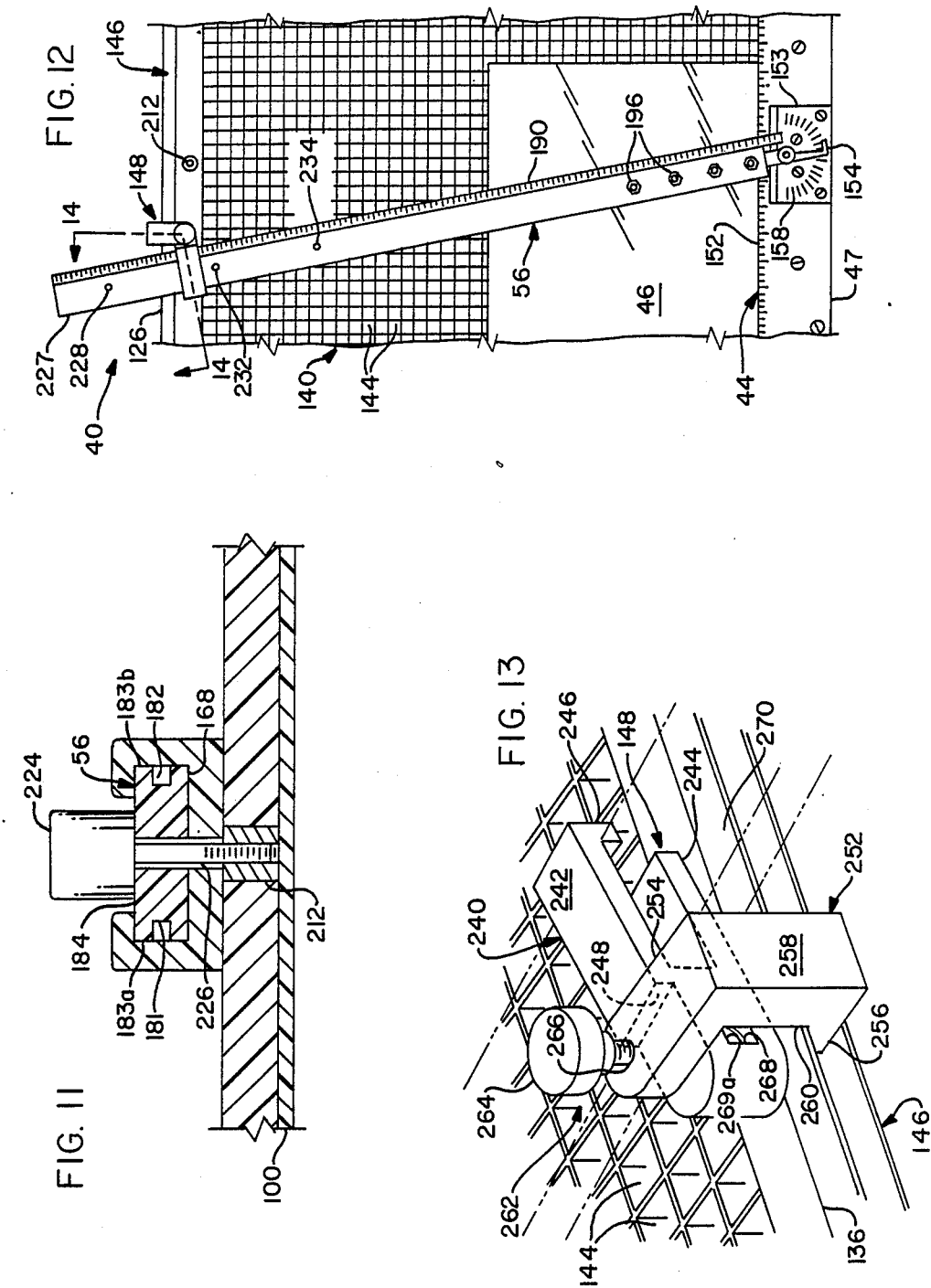

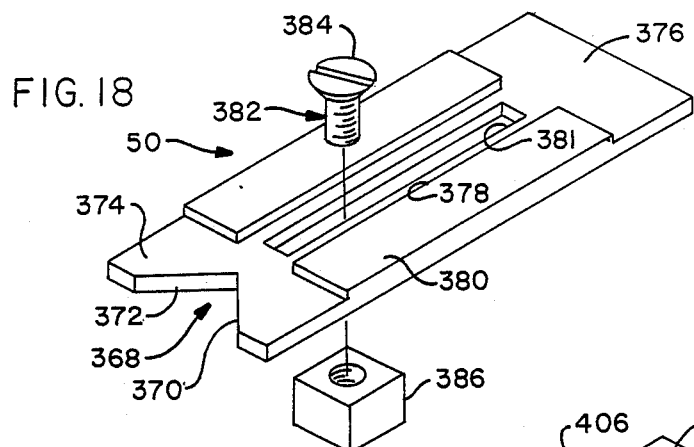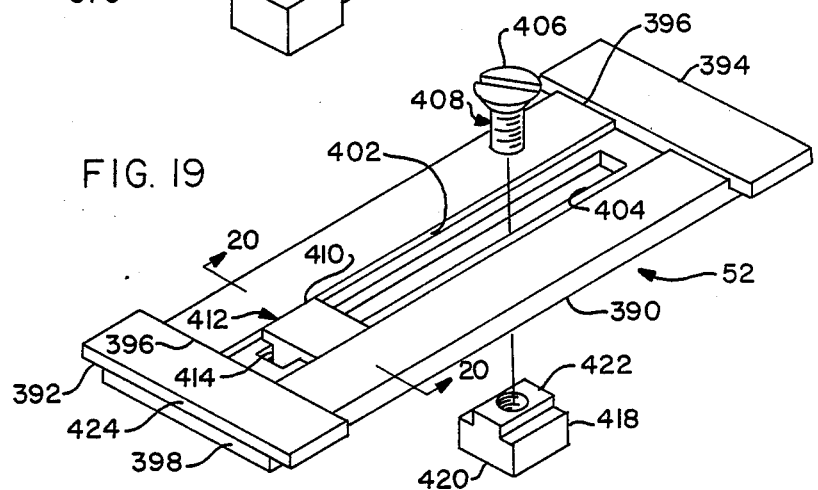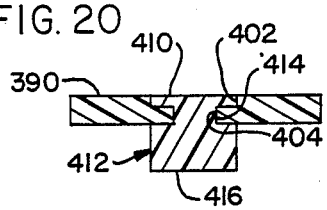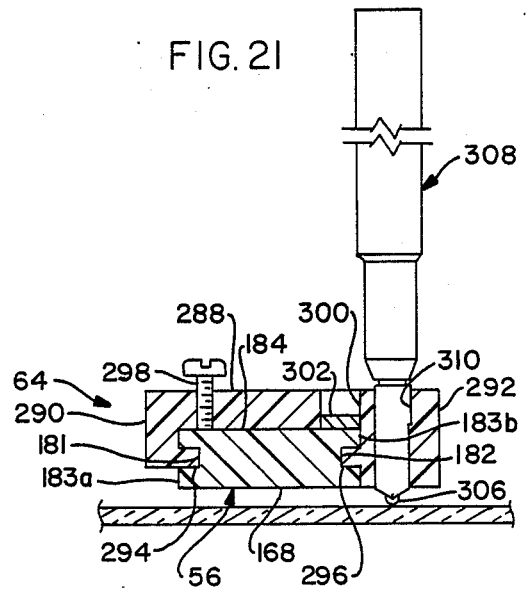

GLASS CUTTING APPARATUS

TECHNICAL FIELD OF THE INVENTION

The present invention relates to novel, improved apparatus for cutting glass and, more specifically, to apparatus of that character which includes: a base for supporting a piece of glass that is to be cut, accessories for holding the glass at a fixed location on the base, and accessories for guiding a glass cutter in a designated rectilinear or arcuate path along the piece of glass.

BACKGROUND OF THE INVENTION

Sheets of glass are typically cut into pieces of particular shapes and sizes by scoring the glass along one or more appropriate lines and by subsequently snapping the glass along the score line, typically with a tool such as a glass breaker.

Traditionally, the lines along which the glass cutter is displaced to produce the score lines have been inked on the glass being cut. The glass cutter is then moved in freehand fashion along the score lines or, if the line is rectilinear one, along a straight edge held against the glass.

Freehand scoring of the glass has the disadvantage that considerable skill and practice is required to generate an accurate score line on the glass being cut. And accurate cutting is desirable, if not essential, particularly if the piece is to be assembled into a mosaic such as a stained glass window or hanging, for example. Even if the artisan is skilled, accuracy may suffer if the surface of the glass is uneven as is often the when it is stained glass that is being worked. Furthermore, it is difficult for the artisan to hold the glass in place; hold a straight edge or other guide along the line the score is to follow; and, at the same time, displace the glass cutter along that line while the emerging the pressure required to generate a satisfactory score.

The foregoing and other disadvantages of the traditional methods for cutting glass have been recognized by, among others, Morton Glass Works, Inc., Morton, Ill. That company attempted to solve these problems with a device called a portable glass shop.

The portable glass shop includes a rigid base on which the glass is positioned, stops for holding the glass in place, and a pivoted straight edge along which a glass cutter can be displaced to score a straight line at a selected angle to a fixed stop extending along one edge of the base.

One disadvantage of the glass shop is that it is useful only in scoring glass along a straight line. Thus, it is of no value in, for example, cutting pieces of glass with an arcuate contour; and pieces of that shape are commonly needed for designs found in stained glass windows and hangings.

Another disadvantage of the glass shop is that the piece of glass being cut must be butted against the fence located at one edge of that device's base while it is being scored. This significantly limits the utility of the device.

Yet another disadvantage of the glass shop is that the stops incorporated in that device are designed to interact only with pieces of glass possessing straight edges. Therefore, the glass shop provides no particular advantage in cutting a piece of glass which has theretofore been cut to an arcuate or other non-rectilinear configuration.

The glass shop also has the disadvantage that glass having a thickness of less than one-fourth inch cannot be accommodated due to the manner in which the straight edge of that device is supported from its base.

SUMMARY OF THE INVENTION

I have now invented, and disclosed herein, a novel, improved, glass cutting (or scoring) system which is free of the above-discussed disadvantages of the glass shop and is otherwise superior to that product.

In general, my novel glass cutting apparatus includes a rigid, twistfree base on which the piece of glass being cut is held while it is scored. The upper part of this base may advantageously be fabricated from an egg-cratelike material. This provides openings into which particles of glass may drop. The particles are thereby kept from interfering with the cutting of the glass and, also, from injuring the artisan employing my novel apparatus. The egg-cratelike configuration also provides a set of uniformly dimensioned and spaced openings which can be employed to locate: (a) the stops which hold the piece of glass being cut in place, (b) the accessories employed to fixedly position the piece of glass, and (3) guides for the glass cutter.

Associated with this base is a pivotedly mounted guide which is employed in scoring straight lines on the surface of the glass being cut. This guide can be quickly locked to the base at commonly employed angles and, almost as easily, at any desired intermediate angle.

The pivotable are or guide of my novel system also carries a glass cutter holder which can be slid along the arm and then locked at any position therealong. This allows the artisan to score an arcuate line of desired radius on the glass being cut. Because the holder for the glass cutter is invariably maintained at a constant distance from the axis about which the arm pivots, arcuate cuts can be made with greater precision and accuracy than they can by the heretofore employed, freehand technique.

A variety of glass holding clamps or positioning devices may be supplied in the novel glass cutting systems I have invented and disclosed herein. These are designed to securely position on the base of my novel systems at selected locations pieces of glass with curved and other non-rectilinear edges as well as those having straight sides. Furthermore, as indicated above, the egg-cratelike construction of the base makes it possible to employ these accessories essentially anywhere on that base. Thus, by novel system is capable of accommodating pieces of glass of significantly different sizes and of allowing the piece of glass being cut to be positioned essentially anywhere on the base, not merely along a fence or other alignment member at one edge of the base.

Yet another accessory with which my novel glass-cutting system can be equipped is an elongated straight edge which parallels a fixed stop or fence at one edge of the system's base. This guide is employed to score the piece of glass being cut along lines parallel to the fixed guide. This straight edge can be locked to the base, and cooperating scales at opposite ends of the latter simplify the task of aligning the straight edge so that the glass can be accurately scored into one or more strips of specified widths.

Also preferably associated with the pivotable are and guide discussed briefly above is a reversible spacer with two sides of different thicknesses. By reversing this spacer, the pivotable arm can be maintained parallel to the upper surface of the base: (a) when a large piece of glass is being cut and the spacer accordingly rides on it, and (b) when a smaller piece of glass is being cut and the spacer accordingly rides on the base itself.

Still another accessory which can oftentimes be employed to advantage is a removable guide with fittings which allow it to be installed in spaced relationship to the fixed guide or fence at the one side of the base. This eliminates the necessity of positioning the glass being cut along the fixed guide, thereby considerably increasing the versatility of my novel system. This arrangement, for example, makes it possible to cut a piece of glass along an arc that might otherwise be impossible to score.

And yet another important accessory which may be supplied is a pivotable glass cutter holder with a bracket which can be displaced along the pivotable arm or guide and then locked to that arm. This makes it possible to locate the center of an arc to be scored at substantially any position on the base of the system. Thus, a much wider variety of arcs can be scored than would be possible if only the arm/guide which is pivotable about a single point were employed.

OBJECTS OF THE INVENTION

From the foregoing, it will be apparent to the reader that one primary and important object of my invention resides in the provision of novel, improved apparatus for cutting glass to a specified size and/or into a specified configuration.

Other also important, but more specific, objects of the invention reside in the provision of apparatus as characterized in the preceding object:

which can be supplied at a relatively modest cost;

which are portable;

which are user friendly and can be employed without extensive instructions or practice;

which allow glass to be cut with accuracy and precision;

which, in conjunction with the preceding object, are designed for cutting along arcuate paths as well as along straight lines;

which, in conjunction with the preceding object, allow straight cuts to be made at an infinite variety of angles relative to a fixed guide at one edge of the system's base; at any distance from that guide; and, in the case of arcuate cuts, with an infinite variety of radiuses and centers of arc;

which allow the piece of glass being worked to be located essentially anywhere on the base of the system;

which are designed to securely hold pieces of glass with curved or other irregular edges as well as those with straight sides in place during the glass cutting operation;

which are provided with appropriate scales to facilitate the accuracy with which glass being worked is cut to size and to facilitate the production of strips or other pieces of glass of duplicate dimensions;

which are rapid and sturdy and have a long useful Service life.

BRIEF DESCRIPTION OF THE DRAWING

In the drawing:

FIGS. 7, 8, and 9 are sections through the glass scoring system of FIG. 1, taken substantially along lines 7—7, 8—8, and 9—9 of the latter;

FIG. 10 is a partial vertical section through the glass scoring system of FIG. 1, taken to show a displaceable spacer device which is employed to support the outer end of the system's pivotably mounted glass cutter guide above the surface of the system's base;

FIG. 11 is a section through the glass scoring system of FIG. 1, taken substantially along line 11—11 of the latter Figure to show an arrangement employed to lock the pivotable glass cutter guide to the base of the system in a selected one of several commonly employed angular positions;

FIG. 12 is a fragment of FIG. 1 showing a clamping assembly employed to lock the pivotable glass cutter guide of the system in angular positions intermediate those in which the glass cutter guide can be locked by the device shown in FIG. 11;

FIG. 13 is a fragmentary, perspective view of the glass scoring system shown in FIG. 1 depicting the details of the accessory supplied for locking the pivotable, glass cutter guide in an intermediate position;

FIG. 18 is a perspective view of a second type of glass positioning restraint with which the glass scoring system of FIGS. 1 and 3 may be equipped;

FIG. 19 is a perspective view of a third specie of glass positioning restraint with which the system of FIGS. 1 and 3 may be equipped;

FIG. 20 is a section through the glass positioning restraint of FIG. 19, taken substantially along line 20—20 of the latter Figure;

FIG. 21 is a section taken essentially along line 21—21 of FIG. 2 to show the details of the glass cutter holder mounted on the pivotable arm of the glass scoring system in order to score an arcuate line on the glass being cut;

DETAILED DESCRIPTION OF THE INVENTION

Figure 1:
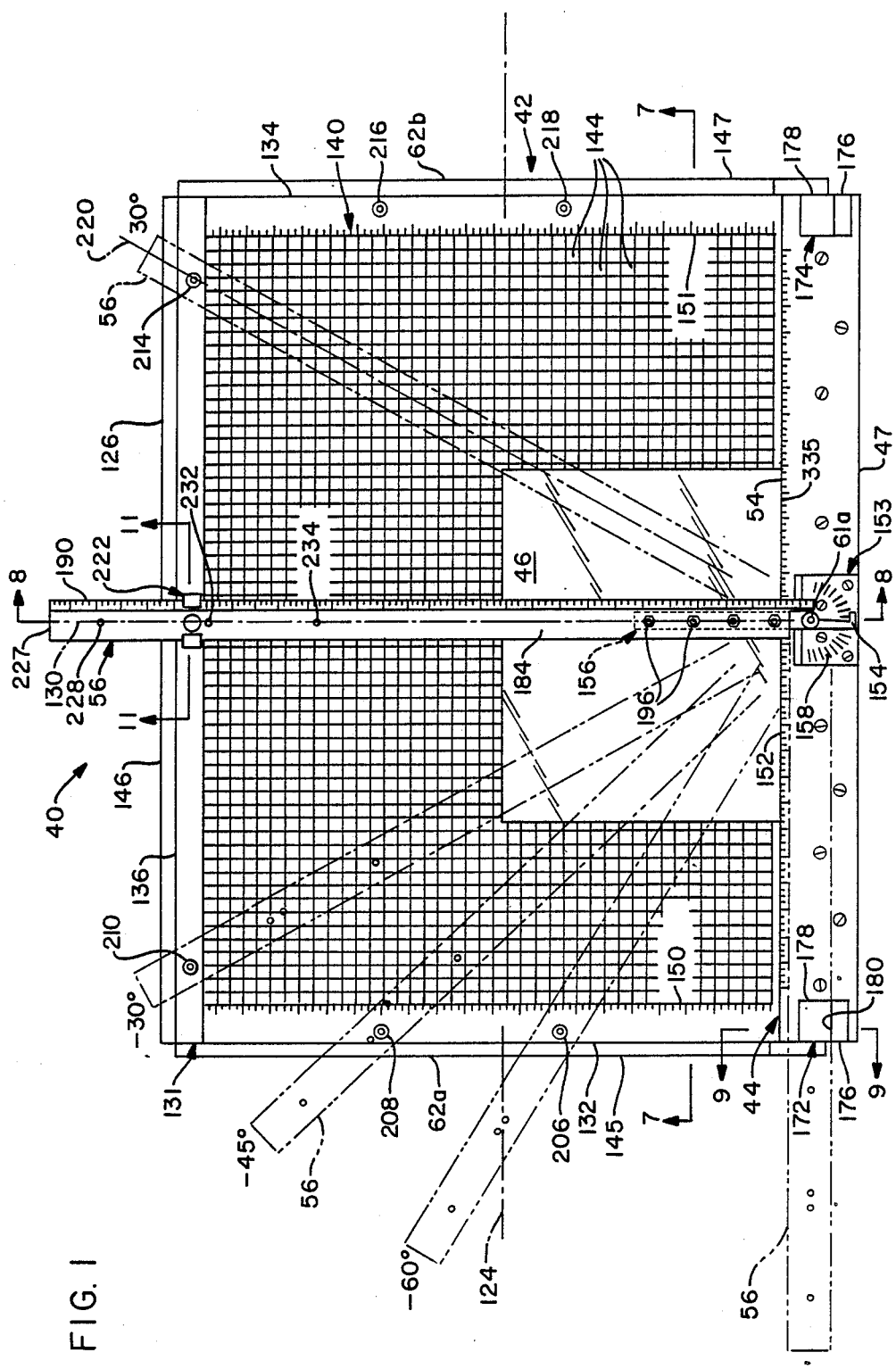
FIG. 1 is a plan view of a glass scoring system constructed in accord with the principles of the present invention and set up for scoring a piece of glass at a right angle relative to a stationary alignment guide or fence extending along the back edge of the scoring system's base.
Figure 2:
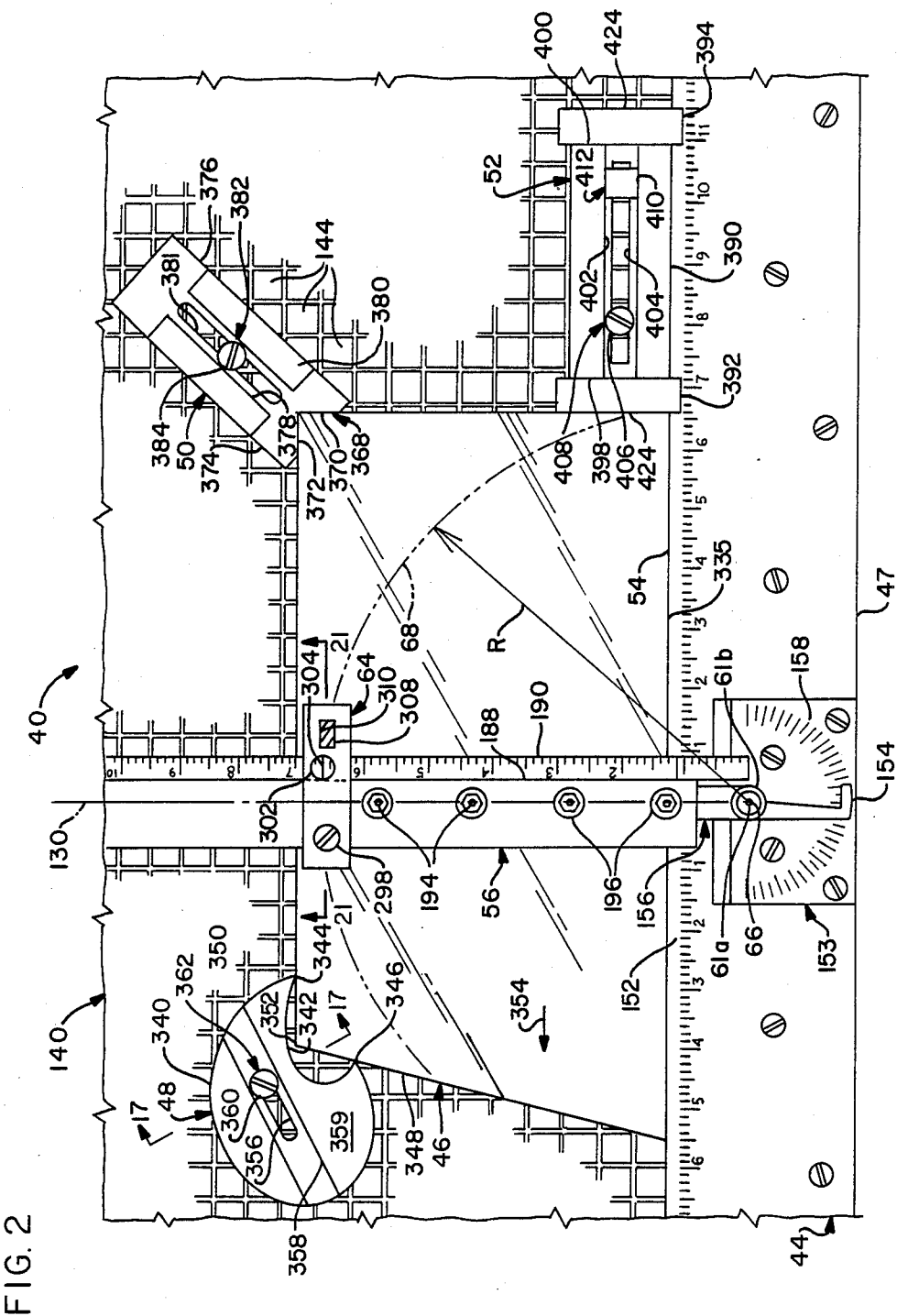
FIG. 2 is a fragment of FIG. 1 to an enlarged scale, it shows such features of the glass scoring system as restraints for securely positioning the glass being cut in a selected location on the base of system, a glass cutter holder which can be displaced along a pivotably mounted arm to score arcs on the glass being cut, and an egg-cratelike base insert.
Figure 3:
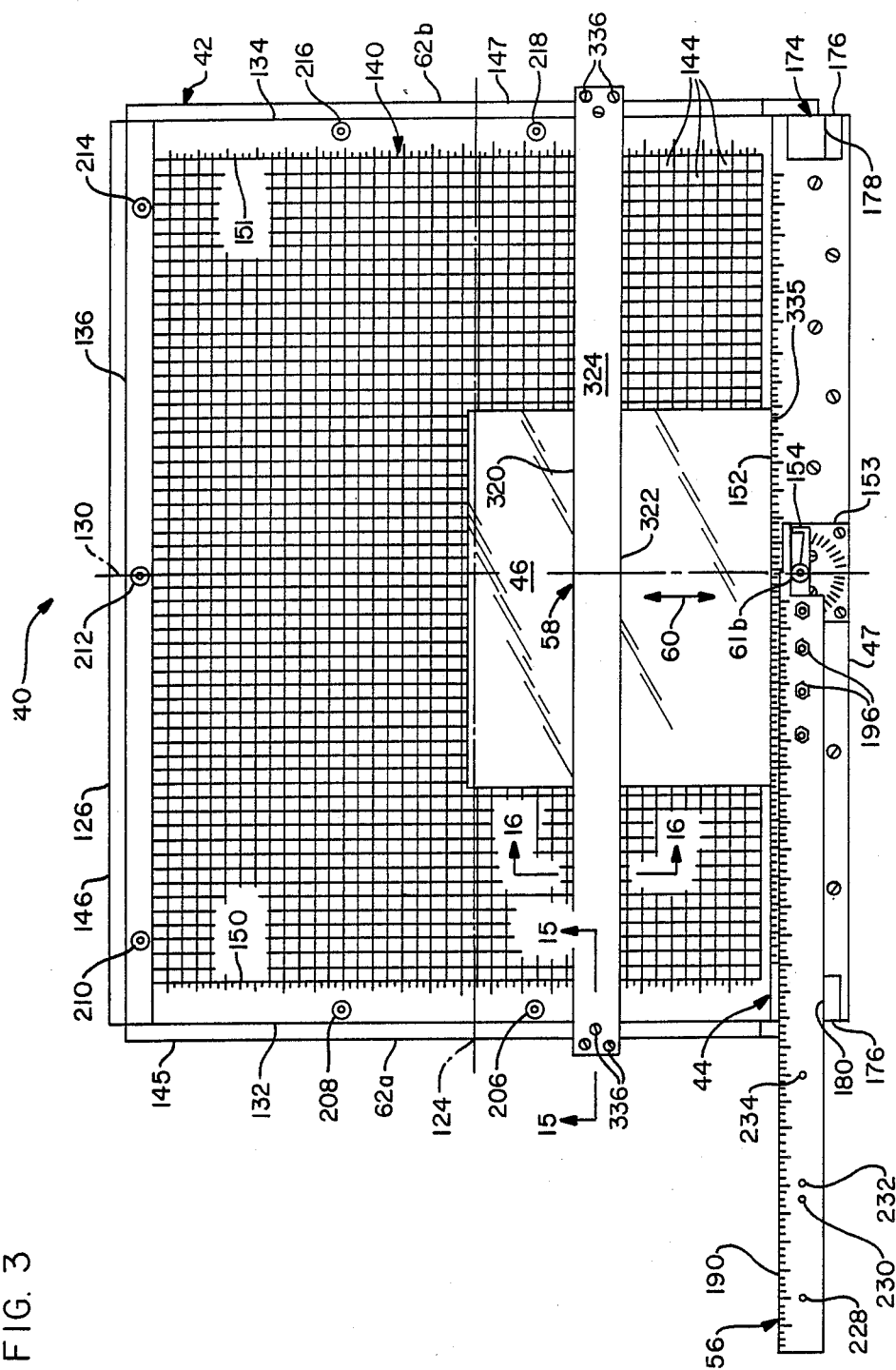
FIG. 3 is a view similar to FIG. 1 but with the glass scoring system equipped with a rectilinearly displaceable guide in order to score the glass being cut along a line parallel to the stationary glass alignment guide.

Referring now to the drawing, FIGS. 1-3 depict a glass scoring system 40 constructed in accord with and embodying, the principles of the present invention.

Among the major components of glass scoring system 40 is a base or support 42. A fixed, elongated, fence 44 for positioning a piece of glass 46 extends along the rear edge 47 of the base. Glass 46 is securely maintained in the wanted position by adjustable holdfasts, stops, or restraints. Three different types of holdfasts embodying the principles of my invention are illustrated in FIG. 2 and identified by reference characters 48, 50, and 52.

Also included in system 40 are guides for the glass cutter employed to score a precisely located and configured break line across a piece of glass thus precisely and securely positioned on base 42. One, removable, pivotable, guide or straight edge for thus piloting a glass cutter along a straight line and at a selected angle relative to the glass orienting and engaging edge 54 of fixed fence 44 is illustrated in FIGS. 1 and 2 and identified by reference character 56.

Glass scoring system 40 may also be equipped with a second, removable, alternatively employable, rectilinearly displaceable guide or straight edge 58. This guide is displaceable along a path (identified by reference character 60 in FIG. 3) which is oriented at right angles to the glass aligning edge 54 of fixed fence 44. Displaceable guide 58 is employed (with pivotable guide 56 removed or swung out of the way) to score a piece of glass such as that identified by reference character 46 along a straight line parallel to the glass aligning edge 54 of fixed fence 44. This guide can be used to particular advantage in cutting a piece of glass into rectangular strips.

Referring now specifically to FIGS. 1 and 2, one of the important advantages of glass scoring system 40 is that it can be employed to score arcs on the glass being cut as well as straight lines. To this end, the above-discussed displaceable glass cutter guide (or straight edge or arm) 56 is pivotably and removably fixed to base 40 with a pivot member 61a and a threaded retainer 61b midway between the ends 62a and 62b of the base and along the back edge 47 of the base where fixed fence 44 is located. And, glass scoring system 40 is provided with a glass cutter holder 64 which can be locked to pivotably mounted arm or glass cutter guide 56 at any selected location therealong. Thus, by employing holder 64 and swinging arm 56 about its pivot axis 66, the piece of glass 46 being cut can be scored along an arc with a radius R such as that identified by phantom line 68 in FIG. 2.

Figure 4:
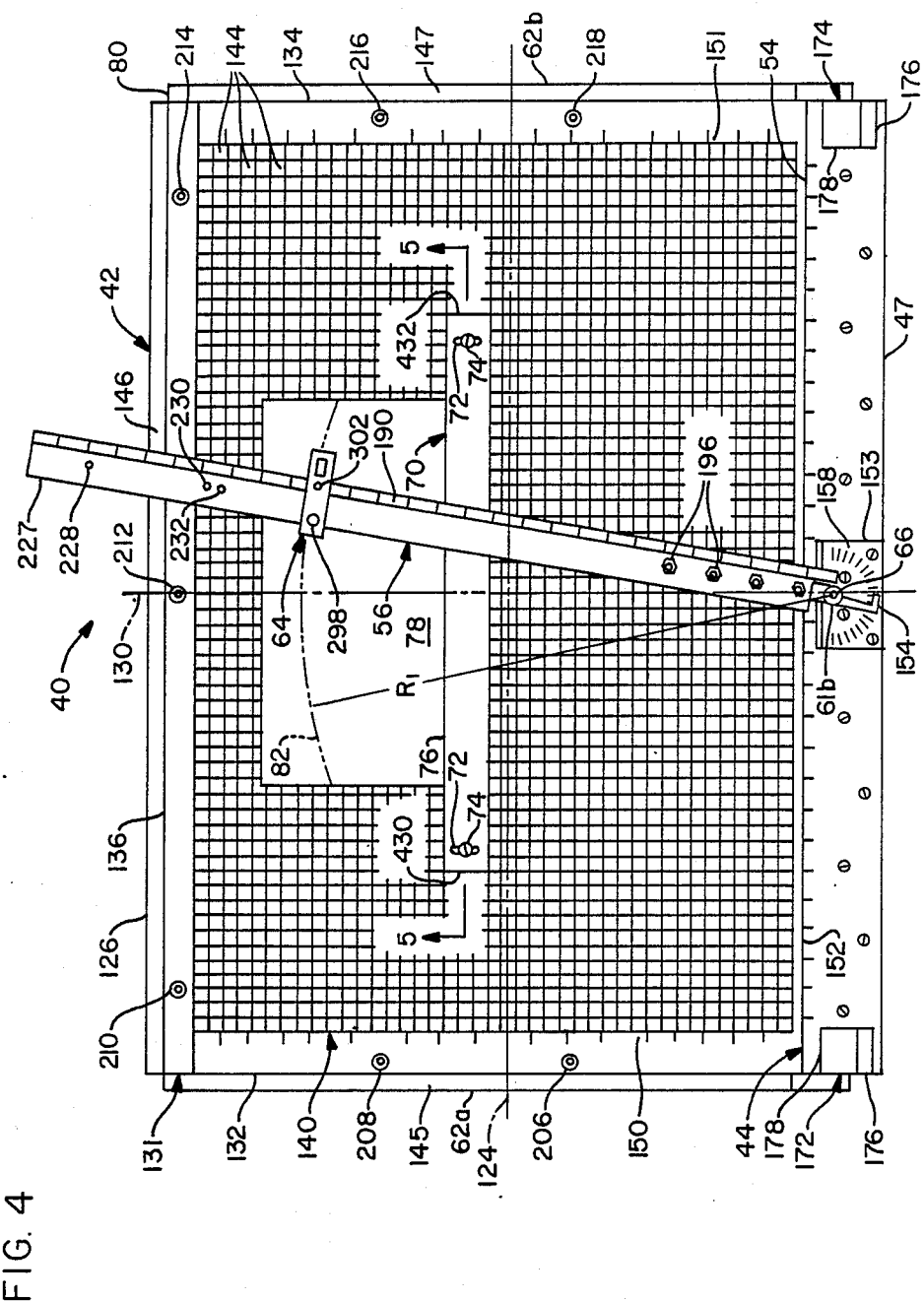
FIG. 4 is a view similar to FIG. 1 but with a removable, elongated glass alignment guide installed on the base of the system to locate the glass being cut in a position away from the stationary alignment guide.
Figure 4A:
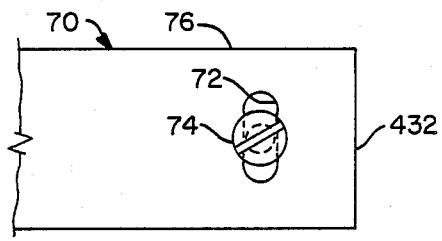
FIG. 4A is a detail of the removable glass alignment guide shown in FIG. 4 to an enlarged scale.
Figure 5:
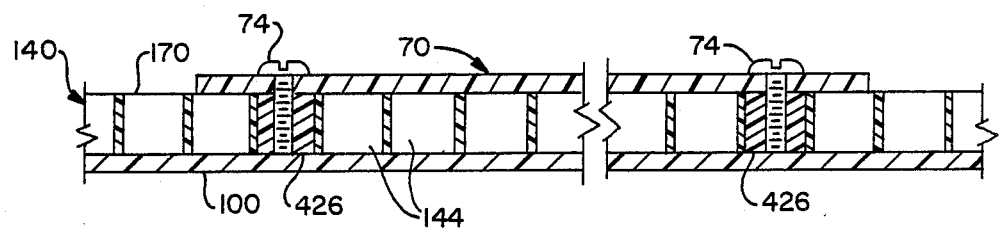
FIG. 5 is a section through the glass scoring system of FIG. 4, taken substantially along line 5—5 of the latter Figure.
Figure 6:
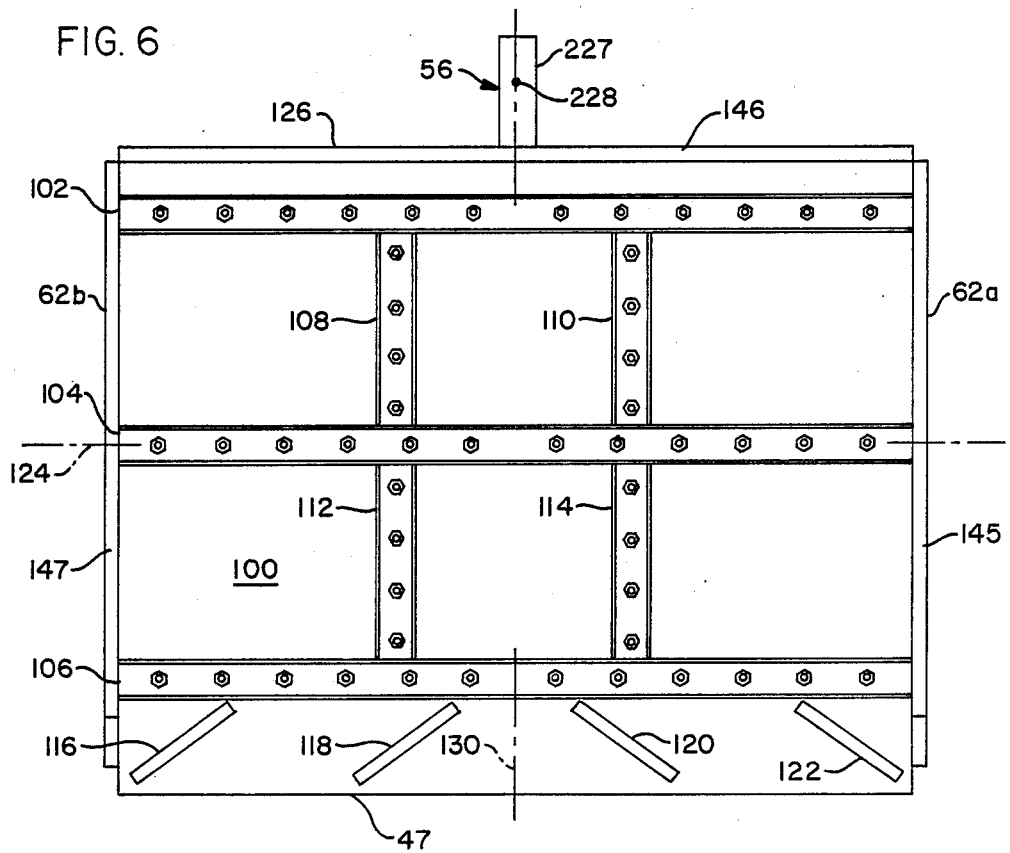
FIG. 6 is a bottom view of the glass scoring system of FIG. 1.

Turning now to FIG. 4, the particular line along which the glass is to be scored may dictate that the glass be located elsewhere on the base 42 instead of being butted against fixed fence 44 as shown in FIGS. 1-3. To accommodate this requirement, glass scoring system 40 may also be equipped with an alternately employable, elongated, removable and relocatable fence 70 with elongated slots 72 and fasteners 74. These allow fence 70 to be adjusted so that its glass-aligning and engaging edge 76 is parallel to the glass-supporting edge 54 of fixed fence 44. As will become apparent to the reader, this allows certain scales provided in system 40 to still be employed when fence 70 is being used to score the glass accurately along precisely located straight lines and arcs.

Universally locatable fence 70 may be employed to position a piece of glass 78 toward the upper right hand corner 80 of base 42 so that this piece of glass can be scored along an arc 82 with a radius $R_1$. It will, in this respect, be appreciated from a comparison of FIGS. 1 and 4 that a piece of glass with the dimensions of the illustrated piece 78 could not be scored along an arc of that radius if the glass were instead positioned against edge 54 of fixed fence 44.

Figure 27:
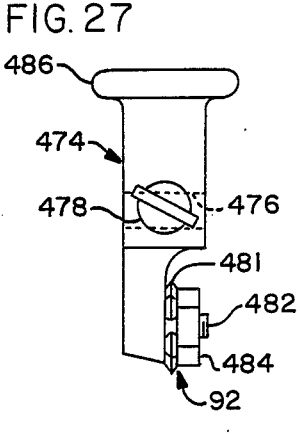
FIG. 27 is a side view of the glass cutter mounted on the radius rod and the glass cutter holder.
Figure 23:
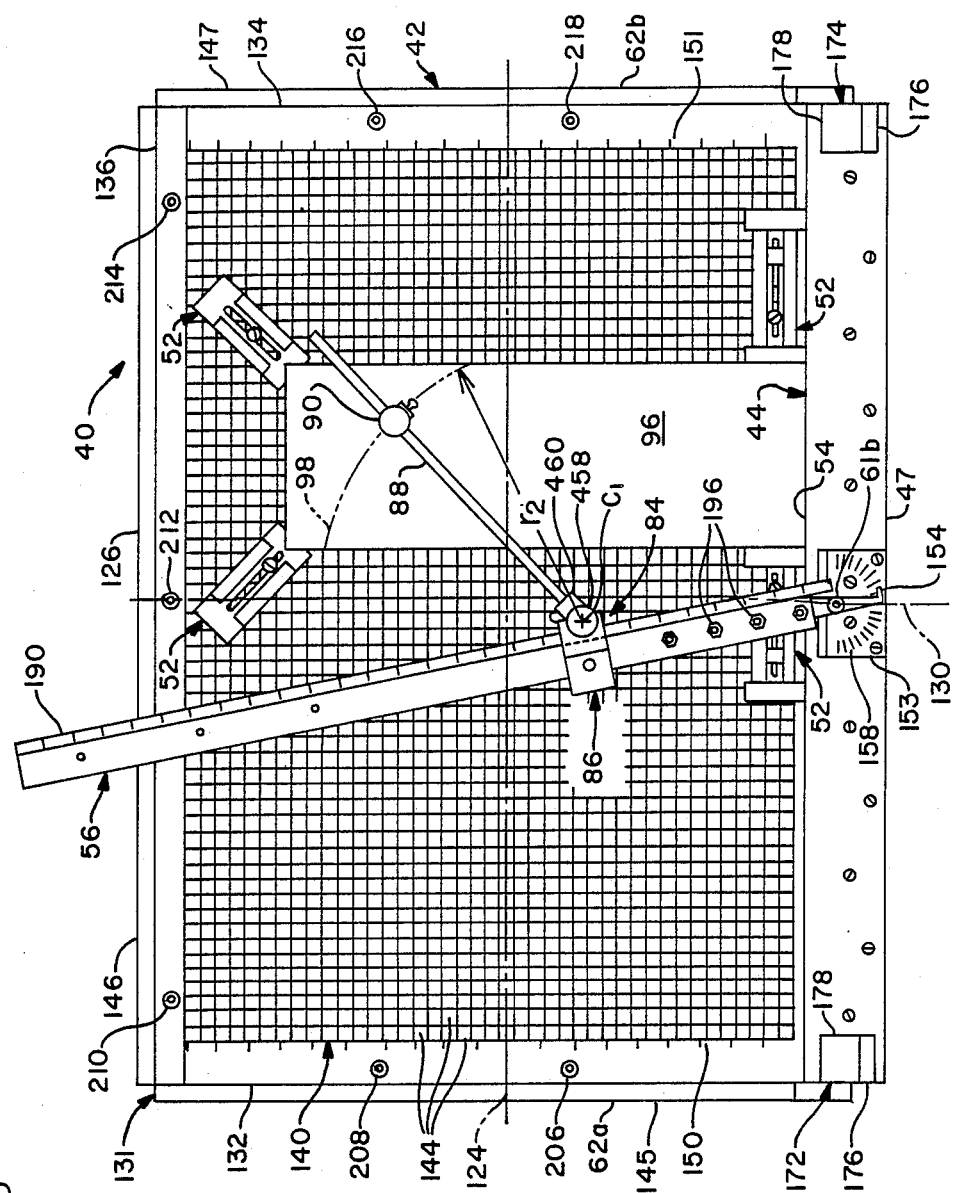
FIG. 23 is a view similar to FIG. 1 showing an accessory with which the glass scoring system depicted in the latter Figure may be provided to score arcs of different radii with centers located at different points on the base of the glass scoring system.

Yet another accessory which can be employed to advantage in glass scoring system 40 is illustrated in FIG. 23 and identified by reference character 84. This accessory, also utilized in scoring arcs on the piece of glass being cut, includes: a bracket 86 which can be displaced to any specified location along pivotably mounted guide 56 (or rectilinearly displaceable guide 58), a radius arm 88 pivotably fixed to bracket 86, a glass cutter holder 90 which can be fixed at any specified point along pivotable arm 88, and a glass cutter 92 (see FIG. 27) fixed to holder 90.

Arc scoring accessory 84 allows the center of an arcuate score line to be located at virtually any point on base 42, and it also allows the radius of the arc traversed by cutter 92 to be varied. FIG. 23, for example, shows glass scoring system 40 set up with accessory 84 adjusted to score a piece of glass 96 along an arc 98 which has a radius $R_2$ and a center $C_1$ located near the center of base 42 instead of along the edge of the base at pivot axis 66 which is the only available option with pivotable arm 56 and glass cutter holder 64.

Referring now to FIGS. 1-3 and 5-7, the base 42 of glass scoring system 40 includes a flat plate 100 (see FIG. 6) reinforced, on its bottom side, with channels 102 . . . 114 and rectangularly sectioned bars 116 . . . 122. Reinforcing channels 102, 104, and 106 parallel the longitudinal axis 124 of base 42 with channels 102 and 106 respectively located at the front and rear edges 126 and 47 of base 42 and the third channel 104 positioned midway between reinforcements 102 and 106. The four retaining channel type reinforcing members 108 . . . 114 are located between and at right angles to reinforcing channels 102 and 104 (or 104 and 106) and are located at equal distances on either side of the midline 130 through base 42.

The four rectangularly sectioned reinforcing bars 116 . . . 122 are located at the rear edge 47 of base 42 with reinforcing members 118, 120, and 116, 122 in mirror image relationship and angled toward the transverse midline 130 of base 42.

As is best shown in FIGS. 1 and 6–8, a frame 131 composed of rectangularly sectioned left and right edge members 132 and 134, front edge member 136, and rear edge member 138 is fixed to the top of plate 100 at the corresponding edges thereof. This frame surrounds an insert 140 of egg crate construction which provides the actual support for the piece of glass being scored. The edges 141a and 141b of the insert are relieved and trapped beneath inwardly extending flanges 142 on frame members 132 and 134 to retain insert 140 in place on the floor 100 of base 42 (see FIG. 7).

The egg crate insert 140 provides cells 144 (see FIGS. 1–3) into which slivers generated in scoring glass can drop. This keeps those slivers from scratching glass subsequently put on support 42 for scoring and also keeps such slivers from injuring the user of glass scoring system 40. All cells 144 have a square cross-section, and they are all of the same size. This is advantageous in positioning a variety of accessories at specified locations on base 42 as will become apparent hereinafter.

Figure 15:
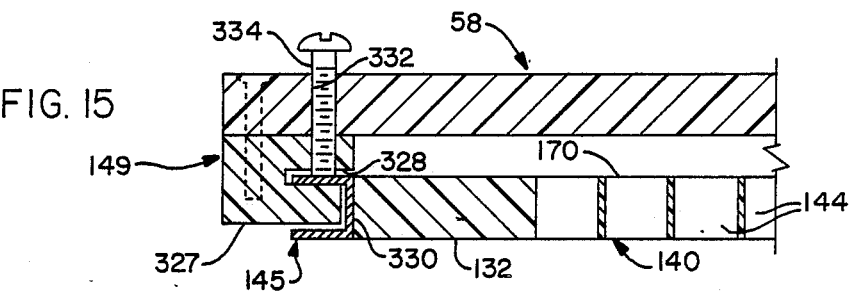
FIG. 15 is a section taken substantially along line 15—15 of FIG. 3 to show the details of the rectilinearly displaceable, glass cutter guide incorporated in the glass scoring system.

Outwardly opening, U-section channels 145, 146, and 147 are fixed to, respectively: left-edge frame member 132, front edge frame member 136, and right-edge frame member 134. These channels accommodate a clamp 148 for locking pivotable, glass cutter guide 56 in the wanted angular position relative to the glass-engaging edge. Side edge channels 145 and 147 also accept complementary mounts or supports for the rectilinearly displaceable, glass cutter guiding bar 58. One of these mounts is depicted in FIG. 15 and identified by reference character 149.

Referring again to FIG. 1, scales 150 and 151 are provided on the upper surface of insert 140. These scales are located at, and extend along, the left and right ends 62a and 62b of base 42. The zero index of each scale is coincident with the glass aligning edge 54 of stationary fence 44.

A third scale 152 is provided on the upper surface of stationary fence 44 adjacent its glass aligning edge 54. The zero index of this scale is coincident with the pivot axis 66 of pivotable glass cutter guide 56, and the scale is numbered both to the left and to the right from the zero index. This is important in that it allows a piece of glass being scored to be centered with respect to pivot axis 66 so that a symmetric arc can be scored on a piece of glass being processed. Also, scale 152 allows the piece of glass 46 to be so positioned relative to glass cutter guide 56 along stationary fence 44 that the glass can be accurately cut along a straight line to a specified dimension.

Also centered on pivot axis 66 and the transverse midline 130 of base 42 is a protractor 153. Cooperating with this protractor is a pointer 154. The pointer is integral with and is an extension of the bracket 156 through which pivot member 61a extends to pivotably secure glass cutter guide 56 to support 42. Pointer 154 extends across protractor scale 158 and is used to identify the angle of glass cutter guide 56 relative to the transverse midline 130 of glass scoring system base 42.

As is shown in FIG. 8, protractor 153 is supported above stationary fence or guide 44 by a sheetlike spacer 160. The protractor fits into a recess 162 in the spacer and is flush with the upper surface 164 of that component. Spacer 160 and a second spacer 166 (see FIG. 8A) which is displaceable along glass cutter guide 56 cooperate to space the bottom surface 168 of the guide a distance $d_1$ above the upper surface 170 of egg crate insert 140. The dimension $d_1$ will typically equal the thickest piece of glass that system 40 might be used to score.

Referring now to FIGS. 1 and 8, stops 172 and 174 are mounted on stationary, glass aligning fence 44 at the left and right edges 62a and 62b of base 42. Each of these stops has a vertical component 176 which limits the travel of swinging glass cutter guide 56. This keeps that component from being rotated off of support 42. That might bend or otherwise damage arm 56 and/or the bracket 156 by which the arm is pivotably secured to base 42.

Each of these stops 172 and 174 also has an integral component 178. This stop component supports the pivotable glass cutter guide 56 when that arm is swung to a limit position such as that identified by reference character 180 in FIG. 1. This, too, minimizes the possibility of unintentional damage to glass cutter guide 56.

Turning now to FIGS. 2, 7, and 8, the pivotable glass cutter guide 56 discussed generally above and employed in scoring arcs and normal or angled straight lines is an elongated bar of rectangular cross-section. Outwardly opening, rectangularly sectioned grooves 181 and 182 coextensive in length with the bar are formed in its opposite edges 183a and 183b midway between the upper and lower surfaces 184 and 168 of the arm. A recess 188 in the upper surface 184 of the arm accommodates a linear scale 190 (see FIG. 1). As shown in the same Figure, the zero index of this scale is coincident with the pivot axis 66 of guide 56. Consequently, that scale can be utilized to locate the glass cutter at the wanted distance from the pivot axis when scoring an arc with glass scoring system 40.

I pointed out above that pivotable glass cutter guide 56 is fixed to base 42 on pivot member 61a by way of the bracket 156 from which integral pointer 154 extends. That bracket is an elongated member seated in a recess 192 in the lower surface 168 of arm 56 (see FIG. 7) so that it will lie flush with the lower surface of the arm and not catch on the glass being scored. Bracket 156 may be attached to arm 56 in any desired manner—for example, by the illustrated machine screws 194 and recessed nuts 196.

Pivot member 61a is mounted on scoring system base 42 at the center of the area circumscribed by protractor scale 158. It has a circular base 198 (see FIG. 7) and a vertically extending, threaded shaft 200. Base 198 is seated in a complementary recess 202 in bracket 156 to rotatably connect pivotable glass cutter guiding arm 56 to support 42. A retainer 61b is threaded on the vertical shaft 200 of the pivot member above a spring washer 204 to secure bracket 156 in place. The just-described arrangement furnishes a rotary connection large enough in diameter to permit an accurate arc to be scored between arm 56 and base 42. At the time, arm 56 can be easily removed when employing rectilinearly displaceable glass cutter guide 58 to score straight lines parallel to the glass aligning edge 54 of stationary guide 44 if the user wishes. All that the user need do is unthread and remove retainer 61b and lift the pivotable guide 56 off the shaft 200 of pivot member 61a.

Referring back to FIG. 1, internally threaded sleeves or inserts 206 . . . 218 are installed in the left-hand, front, and right-hand edge members 132, 136, and 134 of the frame 131 of scoring system base 42. They are placed at those locations where the longitudinal centerline 220 of pivotable guide 56 and the transverse midline 130 of base 42 have commonly employed relative angles therebetween of 0°, ±30°, ±45°, and ±60° (see FIG. 1).

Pivotable guide 56 can be locked in any one of these commonly employed angles with a keeper 222 (see FIG. 7). That component of glass scoring system 40 has a user-manipulatable knob 224 and a threaded shaft 226. The latter extends downwardly through arm 56 and is threaded into the appropriate sleeve 206 . . . 218 in base frame member 132, 134, or 136 to clamp the outer end 227 of arm 56 to base 42.

Four apertures 228 . . . 234 through which shaft 226 of keeper 222 can be extended are formed through arm 56 at intervals therealong (see FIGS. 1 and 7) because the distances from pivot axis 66 to different ones of the several threaded inserts 206 . . . 218 in base 42 are different. A sleeve 238 is installed in each of these through apertures 228 . . . 234 to increase wear resistance.

Turning next to FIGS. 10-12, the clamp assembly 148 alluded to briefly above is employed to lock arm 56 in place at angles other than those for which sleeved inserts 206 . . . 218 and keeper 222 are provided.

Clamp assembly 148 includes a main body component 240 with top and bottom wall sections 242 and 244 and side wall sections 246 and 248. These wall sections of component 240 respectively embrace the upper and lower surfaces 184 and 168 of pivotable glass cutter guide 56 and the sides or edges 183a and 183b of that system component to guide clamping assembly therealong. Bottom wall section 244 is vertically dimensioned to space the outer end 227 of pivotable guide 56 the same distance above the upper surface 170 of egg crate insert 140 that the pivoted end of the arm is located above that surface by spacer 160.

Coupled to this just-described, guide component 240 of clamp assembly 148 is a second, generally U-shaped component 252 with upper and lower sections 254 and 256 separated by an integral, vertical section 258. The lower, horizontally extending section 256 of component 252 is dimensioned to fit within any one of the three channels 145 . . . 147 extending respectively along the left-hand edge 62a, front edge 126, and right-hand edge 62b of base 42. Clamp assembly main body component 240 fits within the recess 260 defined by the upper, lower, and vertical sections 254 . . . 258 of U-shaped clamp assembly component 252.

The final component of the clamp assembly 148 is a clamp screw 262 which includes an user-manipulatable knob 264 and a vertically depending, threaded shaft 266 with a bell-shaped keeper 268 at its lower end. This keeper is located in a recess or chamber 269a in clamp assembly component 240.

As is apparent (particularly) from FIGS. 11 and 12, clamp assembly screw 262 allows clamp assembly component 252 to rotate with respect to the guide component 240 slidable along pivotable arm 56. This permits the lower flange 256 of component 252 to be installed in the appropriate base edge-associated channel 145 . . . 147. Clamp screw 262—which is threaded through the upper flange 254 of component 252 and extends through an aperture 269b into chamber 269a—is then tightened. This draws clamp assembly components 240 and 252 together, clamping the upper flange 270 of a channel 145 . . . 147 therebetween. That locks clamp assembly 148 to the channel and thereby fixes glass cutter guide 56 in the wanted angular position relative to the transverse midline 130 of glass scoring system base 42 by clamping the lower flange 244 of clamp assembly component 240 against the upper surface of the frame member 132, 134, or 136 on which flange 244 rests and against the upper surface 170 of egg crate insert 140.

It was pointed out above that pivotable guide 56 is employed in scoring arcs as well as being used as discussed above to score straight lines. To score an arc on a piece of glass such as that identified by reference character 46, clamp assembly 148 is removed from arm 56; and the spacer 166 (see FIG. 8A) and glass cutter holder 64 (see FIGS. 2 and 18) are installed. Spacer 166 maintains parallelism between pivotable guide 56 and the upper surface 170 of base 42. Holder 64 positions the glass cutter (not shown) a specified distance from pivot point 66 so that an arc of the wanted radius can be scored on the piece of glass being cut—for example, to score an arc 68 of radius $R_3$ on the sheet of glass 46 illustrated in FIG. 2.

Turning next to FIG. 10, spacer 166 is composed of upper and lower, U-sectioned components 274 and 276 fixed together in an inverted relationship with the horizontal flanges 278 and 280 of those components respectively embracing the upper and lower surfaces 184 and 168 of pivotable guide 56. Similarly, the vertical sections 282 and 284 of the lower component 276 embrace the left- and right-hand sides 183a and 183b of the guide so that spacer assembly 166 surrounds, and is slidable along, the pivotable glass cutter guide 56.

As shown in FIG. 10, the horizontal flange 278 of upper spacer component 274 is substantially thinner than the corresponding section 280 of the lower assembly component 276. With the guide assembly 166 installed on pivotable guide 56 as shown in FIG. 8A and assembly component 276 resting on the upper surface 170 of egg crate insert 140, the lower surface 168 of guide 56 and surface 170 are parallel. Conversely, guide assembly 166 can be turned upside down and reinstalled. That mode of installation, employed when the guide is riding across a piece of glass being scored rather than on surface 170, compensates for the thickness of the glass, again keeping guide 156 parallel to the upper surface 170 of base 42.

Pivotable glass cutter guide 56 is kept parallel to the upper surface 170 of base 42 so pieces of glass can be slid in and out without having to unlock the arm and move it out of the way. Instead, all that need be done to remove and replace a piece of glass is to loosen the appropriate holdfast(s), remove the scored glass, and slide in a new piece. This speeds up the process of removing and replacing pieces of glass. And this approach also makes it possible to precisely position succeeding pieces of glass at the same place on base 42, thereby making it a relatively simple process to cut successive pieces of glass to the same shape and/or size.

Referring now to FIG. 21, the glass cutter holder 64 referred to above has a horizontal top section 288 interposed between two depending end sections 290 and 292. Flanges 294 and 296, integral with and extending inwardly from the just-mentioned end sections 290 and 292, are slidingly fitted in those grooves 181 and 182 in the sides 183a and 183b of pivotable glass cutter guide 56. This slidingly guides holder 64 along pivotable guide 56.

Holder 64 is locked in the wanted position along guide 56 by a screw 298 which is threaded through the upper flange or section 288 of the holder into contact with the upper surface 184 of guide 56. Thus, by tightening screw 298, holder 64 can be locked to guide 56. By loosening screw 287, holder 64 can be freed for sliding movement along the guide.

Referring still to FIG. 21, a vertical aperture 300 is formed through the upper flange 288 of guide 64 in alignment with the scale 190 on pivotable glass cutter guide 56. Mounted in the lower end of that aperture is a disc 302 bearing an index mark 304 (see FIG. 2). This index is aligned with the cutting edge of the wheel 306 of the glass cutter 308 mounted in holder 64. Consequently, when index 304 is aligned with a particular index mark on scale 190, glass cutter 308 will score an arc of the corresponding radius on the piece of glass being cut—for example, that identified by reference character 46 in FIGS. 2 and 18.

An aperture 310 is formed in the end section 292 of glass cutter holder 64, and the glass cutter 308 is installed in this aperture as shown in FIG. 21. Aperture 310 can be configured to accept glass cutters made by a variety of manufacturers.

Figure 22:
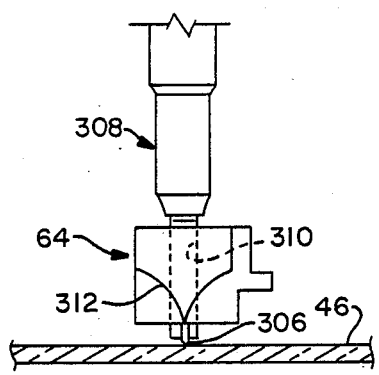
FIG. 22 is an end view of the glass cutter holder illustrated in FIG. 21.

As shown in FIG. 22, an indicator 312 is fixed to the end section 292 of holder 64. This indicator is also aligned with cutter wheel 306. It therefore allows the user of glass scoring system 40 to identify the path which cutter wheel 306 will follow. Thus, the glass cutter can be accurately positioned to follow an arcuate line traced or otherwise placed on the glass being cut. This method of positioning the glass cutter is an alternate to using index mark 304 to locate the cutter. It will typically be employed when the arc to be scored is inked or otherwise marked on the piece of glass being cut.

Figure 16:
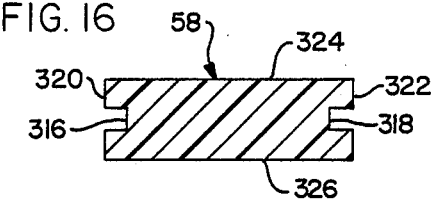
FIG. 16 is a section through the rectilinearly displaceable glass cutter guide, taken substantially along line 16—16 of FIG. 3.

Referring now to FIGS. 3, 15, and 16, the rectilinearly displaceable glass cutter guide 58 employed for scoring lines parallel to the glass aligning edge 54 of stationary fence 44 is an elongated, rectangularly sectioned bar. Rectangularly sectioned grooves 316 and 318 extend the length of guide 58 and open onto opposite sides 320 and 322 of that member midway between its upper and lower surfaces 324 and 326.

The two, above discussed mounts 149 by which guide 58 is supported from the base 42 of glass scoring system 40 are identical. They are assembled to the opposite ends of guide 58 in facing or mirror image relationship. Only the left-hand guide assembly 149 will be described in detail here because of the identify between the two supports.

As best shown in FIG. 15, left-hand guide support 149 includes a rectangularly sectioned component 327 with a horizontally oriented slot 328 opening onto its inner side 330. Slot 328 is dimensioned to accept the upper flange 270 of the channel 145 at the left-hand side of base 42.

A drilled and tapped aperture 332 extends through rectilinearly displaceable glass cutter guide 58 and the upper part of mount 149 to slot 328, and a screw 334 is threaded through aperture 332. By tightening this screw, glass cutter guide 58 and its left-hand support 149 can be clamped to the flange 270 of left-hand channel 145. This locks the left-hand end of glass cutter guide 58 and support 149 to channel 145 at a selected location therealong. Thus, the left hand end of the guide 58 is fixed relative to the base 42 of glass scoring system 40 and the glass positioning edge 54 of fixed fence 44.

Loosening screw 334 frees the ends of glass cutter guide 58 for movement along base edge-associated channels 145 and 147 toward and away from the glass alignment edge 54 of stationary fence 44. Thus, guide 58 can readily be locked to base 42 at a selected distance from stationary fence 44 to cut a piece of glass such as 46 along a line parallel to that edge 335 of the glass butted against the stationary fence.

Glass cutter guide 58 may be attached to the supporting, channel engaging mounts 149 in any convenient fashion—for example, by the machine screws 336 illustrated in FIGS. 3 and 15.

Referring still to FIG. 3, one of the two sides or edges 320 or 322 of glass cutter guide 58 can be aligned with corresponding index marks on the scales 150 and 151 at the opposite ends of base 42. This allows strips of glass of a selected width to be cut. In this respect, by employing scales at both sides of base 42, the user can ensure that glass cutter guide 58 is precisely parallel to the alignment edge 54 of stationary, glass aligning fence 44.

Returning now to FIG. 2, I pointed out above that a variety of holdfasts of different character may be incorporated in glass cutting system 40 to hold in place the piece of glass being scored. The first of these—mentioned above and identified by reference character 48—is fabricated from appropriate plate or sheet material and has a generally commalike configuration with a convex external surface 340 and a concave recess 342. Surfaces 340 and 342 intersect in tips 344 and 346. As shown in FIG. 2, tips 344 and 346 can be engaged with the adjacent sides 348 and 350 of a piece of glass 46 being cut and separated by a corner 352 to hold glass 46 against stationary fence 44 and to keep the glass from shifting to the left as indicated by arrow 354 in FIG. 2.

On occasion, the piece of glass being cut may have a concave periphery. In such instances, the convex surface 340 of guide 48 may be butted against the glass being scored to position the glass and keep it from moving.

Figure 17:
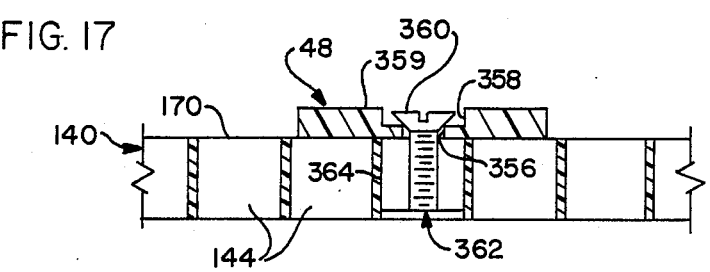
FIG. 17 is a section, taken essentially along line 17—17 of FIG. 2 to show the details of one accessory with which the glass scoring system of FIGS. 1 and 3 is provided to hold the glass being cut in place.

Referring still to FIG. 2, and also to FIG. 17, an elongated slot 356 is formed in the bottom of a similarly elongated groove 358 which opens onto the upper surface 359 of stop or holdfast 48. Groove 358 accepts the head 360 of a machine screw 362 and keeps that head from interfering with the pivotable movement of glass cutter guide 44 or the rectilinear displacement of glass cutter guide 58. The shank of screw 362 extends downwardly through slot 356 and is threaded into rectangularly sectioned block or lug 364. Block 364 is dimensioned to fit snugly within a selected cell 144 of the egg crate insert 140 of glass scoring system base 42 to fix stop 48 to the base. Thereafter, holdfast 48 may be displaced rectilinearly relative to screw 362 and/or rotated about that screw to bring it into engagement with the piece of glass being scored. Screw 362 is then tightened to clamp stop 48 against base insert 140 and thereby fix the stop in the orientation and at the position to which it is thus adjusted.

In thickness, both stop 48 and the stops 50 and 52 discussed hereinbelow are dimensioned so that they will not interfere with the displacement of pivotable glass cutter guide 56 or rectilinearly displaceable glass cutter guide 58; i.e., so that guide 56 or guide 58 may slide over the stop or stops being employed.

Turning next to FIGS. 2 and 18, the second of the glass positioning restraints—50—is an elongated member of sheet material with a V-shaped notch 368 formed in one end thereof. The glass engaging sides 370 and 372 of notch 368 may be oriented at right angles to each other to embrace adjacent sides of a piece of glass with a square corner, but this is by no means required.

As best shown in FIG. 18, the ends 374 and 376 of restraint 50 are relieved. This is done because restraint 50 may be thicker than the piece of glass being scored. In such circumstances, the relieved ends of the restraint allow the glass cutter to run off the edge of the glass being scored without interference from the restraint should that component of glass scoring system 40 be located in the path of the cutter.

This technique of relieving the upper surface of a stop or restraint so that a glass cutter can freely run off of the piece of glass being scored can also be applied to other restraints employing the principles of my invention. These include the holdfasts identified above by reference characters 48 and 52.

A longitudinally extending recess or groove 378 opens onto the upper surface 380 of restraint 50, and an elongated slot 381 is formed in the bottom of that recess. A machine screw 382 extends through slot 382 and is threaded into a square retaining lug 386. The head 384 of screw 382 disposed in recess 378 to keep it from interfering with the movement of pivotable glass cutter guide 56 or rectilinearly displaceable glass cutter guide 58 across the holdfast.

Like the corresponding component of stop 48, the lug 386 of restraint 50 is dimensioned to fit snugly within a selected cell 144 of the egg cratelike insert 140 of glass scoring system base 42. The holdfast may then be displaced rectilinearly with respect to fastener 382 and rotated about that fastener until the sides 370 and 372 of notch 368 engage adjacent edges 348 and 350 of the piece of glass 46 being cut on opposite sides of the corner 352 between those edges of the glass. Thereafter, fastener 382 is tightened to lock the restraint in the position to which it is adjusted, thereby cooperating with one or more additional restraints and/or stationary fence 44 to hold the glass being cut in the desired position on base 42 (an exemplary piece of glass 46 and a typical location thereof are shown in FIG. 2 as indicated previously).

The third, exemplary stop or holdfast for the glass being cut—identified by reference character 52—is best shown in FIGS. 2, 19, and 20. Holdfast 52 has an elongated body 390 of sheet or plate material and a rectangular configuration. Cross pieces 392 and 394 are fixed to body 390 in recesses 396 at the opposite ends 398 (only one shown) of body member 389 or fabricated as integral parts of the body member.

A longitudinal recess 402 extends from end-to-end of holdfast body 390; and a similarly oriented, elongated slot 404 is formed in the bottom of recess 402. Recess 402 accommodates the head 406 of a machine screw 408 and the square, integral head 410 of a cooperating holdfast positioner or locater 412. This keeps the holdfast and screw 408 from interfering with the movement of a glass cutter guide such as those identified in drawings by reference characters 56 and 58.

Holdfast locator 412 also has an integral, intermediate, non-circular section 414 slidingly fitted in slot 404 and an also integral bottom section 416. The bottom section 416 of restraint locator 412 has a circular section and is dimensioned to fit snugly within the cells 144 of the insert 140 of scoring system base 42

As is best shown in FIG. 19, the just-described fastener 408 of holdfast 52 extends through slot 404 and is threaded into a lug 418. Like the corresponding components 364 and 386 of restraints 48 and 50 (see FIGS. 17 and 18), lug 418 has a square part 420 that is dimensioned to fit snugly in a cell 144 of insert 140. Lug 418, however, also has an integral upper section 422 which is dimensioned for a sliding fit in the slot 404 extending along the body 390 of restraint 52.

Lug 418 and locater 412 can be displaced along slot 404 relative to holdfast body member 390 because they can slide. However, neither of the just-identified components can rotate relative to the body 390 of restraint 52. This allows stop 52 to be aligned—without the use of a protractor or other implement—parallel to the longitudinal axis of scoring system base 42 as shown in FIG. 2 or, alternatively, at an angle of 90° relative to the illustrated orientation. Thus, stop 52 can be used to either hold a piece of glass being cut against fixed guide or fence 44 or to keep the piece of glass from shifting laterally on scoring system base 42. The cross or end pieces 392 and 394 of stop 52 provide surface 424 (see FIG. 2) which engage the edges of the glass 46 being scored over an extensive area. Thus, stop 52 is capable of holding the glass securely in place against fixed fence 44 or against a cooperating stop.

Stop or holdfast 52 is positioned on base 42 by installing lug 418 and positioner 412 in spaced apart, rectilinearly aligned cells 144 of insert 140 (see FIG. 2). The body 390 of the stop can then be rectilinearly displaced along a path extending in the same direction as slot 404 until the glass engaging surface 424 on one of the holdfast cross pieces 392 or 394 is butted against the piece of glass to be scored—for example, the piece of glass identified by reference character 46 in FIG. 2. Fastener 408 is then tightened to fix stop 52 in the position to which it is thus adjusted.

Turning next to FIG. 4, I pointed out above that glass scoring system 40 may also be equipped with an elongated, removable and relocatable glass positioning guide 70 so that the glass being scored can be positioned on base 42 without butting the glass against fixed alignment guide or fence 44. This of course significantly increases the versatility of glass scoring system 40. For example, as shown in FIG. 4 and mentioned above, relocatable guide 70 permits one to score an arc of large radius on a small piece of glass 78. This could not be done if it were instead necessary to position that piece of glass against fixed fence 44.

Alignment guide member 70 is an elongated, rectangular component. It can be fabricated from any reasonably sturdy, preferably flexible sheet material.

I also mentioned above that the fasteners 74 of guide 70 extend through elongated slots 72 in elongated, main member 76 of the guide. These fasteners are threaded into lugs 426 of the character discussed above in conjunction with stops 48 . . . 52 and are dimensioned to fit in the cells 144 of scoring system base insert 140. The distance between the two fasteners equals to the distance between a selected number of cells 144—24 in one exemplary glass scoring system 40 embodying the principles of the present invention.

As suggested in FIG. 4, glass alignment guide 70 is installed at an appropriate location on base 42 by plugging lugs 426 into the appropriate cells 144 of scoreboard base insert 140. Thereafter, the ends 430 and 432 of guide member 70 are shifted until the glass-supporting edge (normally 434) of member 76 is aligned as and where wanted. Fasteners 74 are then tightened to retain guide member 70 in the position to which it is thus adjusted by clamping the ends 430 and 432 of that member against base insert 140.

Referring still to the drawing, it was pointed out above that FIG. 20 depicts an assembly 84 which may be employed to score arcs on the glass being cut, that the radius of the arc scored with this device may be varied, and that the center of the arc may be located at virtually any point on the surface of glass scoring system base 42. I further pointed out that arc scoring device 84 includes a displaceable bracket 86, a radius rod 88 pivotably fixed at one end to bracket 86, and a glass cutter 92 displaceable to selected locations along the radius rod so that the arc of wanted radius can be scored on the glass being cut.

Figure 24:
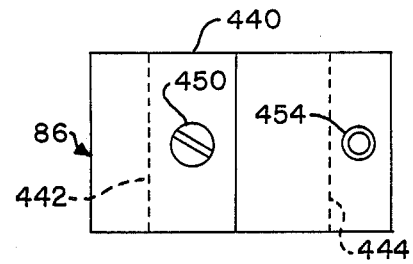
FIG. 24 is a plan view of a rectilinarly displaceable bracket incorporated in the arc scoring accessory depicted in FIG. 23.
Figure 25:
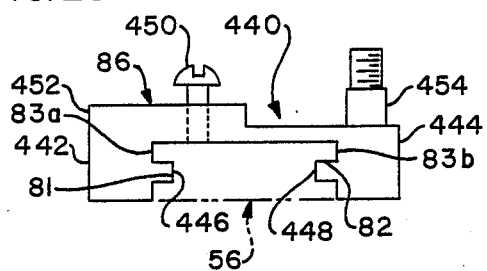
FIG. 25 is a side view of the bracket illustrated in FIG. 24.

Bracket 86, best shown in FIGS. 24 and 25, has a platelike top section 440 with depending, blocklike, side members 442 and 444 at the opposite ends thereof. Midway between the upper and lower surfaces of side members 442 and 444, and extending inwardly therefrom, are lugs or projections 446 and 448. These lugs slidingly fit in corresponding ones of two grooves formed on the opposite edges of the pivotable glass cutter guide 56 or the rectilinearly displaceable glass cutter guide 58—for example, into the grooves 181 and 182 formed in the opposite edges 183a and 183b of pivotably mounted glass cutter guide 56. This traps the glass cutter guide between side or end members 442 and 444 of bracket 86 and against the top plate 440 of that component. At the same time, this arrangement allows bracket 86 to be slid along guide 56 to locate the center of an arc to be scored at the desired position along the glass cutter guide.

A fastener 450 is threaded through an enlarged thickness section 452 of bracket top plate 440. This fastener is tightened against the upper surface 184 of glass cutter guide 56 to lock bracket 86 in place once it has been displaced to the desired location along glass cutter guide 56.

Figure 26:
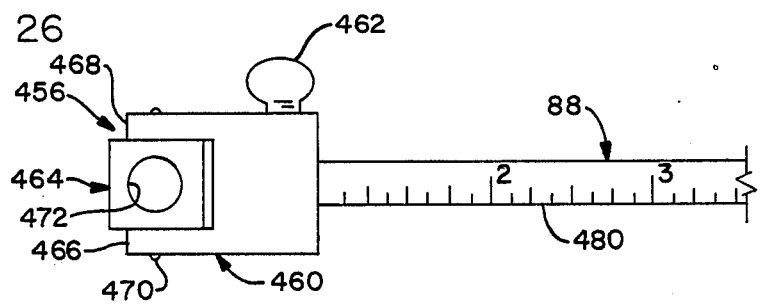
FIG. 26 is a partial plan view of a glass cutter supporting radius bar and a universal joint for pivotably connecting the radius bar to the slidable bracket illustrated in FIGS. 24 and 25.

Radius rod 88 is pivotably fixed to bracket 86 by a vertically extending pivot member 454 located above end member 442 of the bracket, a universal joint 456 (see FIG. 26), and a retainer 458. The retainer knob 458 is threaded onto the upper end of pivot member 454 to hold universal joint 456 against the top plate of bracket 86.

Universal joint 456, retainer knob 458, radius rod 88, and glass cutter holder 90 are components of an Inland Craft combination tool. Because this tool is commercially available, it is not deemed necessary to describe the components identified in the preceding sentence in great detail herein. Briefly, however, universal joint 456 includes a bracket 460 which is fixed to one end of radius rod 88 with a thumbscrew 462. A second universal joint component 464 is pivotably supported between and from two parallel arms 466 and 468 of bracket 460 by a transversely extending pivot member 470. This allows radius rod 88 to be pivoted in a vertical direction to lift glass cutter 92 away from and lower it onto the glass being scored—for example, that piece of glass identified by reference character 96 in FIG. 23.

Pivot member 454 extends upwardly through a vertical aperture 472 in universal joint component 464. This allows cutter 92 to be swung through the arc 98 about center $C_1$ (see FIG. 23).

Turning now to FIGS. 23, 24, 26, and 27, the glass cutter holder 90 of arc scoring device 84 has a vertically oriented body 474 with a horizontal, rectangularly configured bore 476 extending from end-to-end therethrough. Radius rod 88 extends into bore 476 and is fixed to holder body 474. Glass cutter holder 90 is retained at the desired location along radius rod 88 by tightening a thumbscrew 478 threaded into the body 474 of the glass cutter holder. As shown in FIG. 23, a locator scale 480 for glass cutter 92 is provided on radius rod 88 so that an arc of a specific dimension can easily be scored on the glass being cut.

Glass cutter 92 has a cutting wheel 481. This cutting wheel is rotatably supported from cutter holder body 474 on an axle indicated in FIG. 27 by centerline 482 and secured in place by a nut 484. A handle 486 is fastened to the top of cutter holder body 474 in any convenient fashion to expedite the displacement of cutter holder 90 along the selected arcuate path and to facilitate the application of appropriate pressure to cutter wheel 481.

It will be apparent to those to whom this specification is addressed that the Inland Craft components discussed above do not have to be employed in generating arcuate score lines with a selectively locatable center and selected radius in accord with the principles of my invention. It is therefore to be understood that the particular device 84 described above and illustrated in the drawings is merely representative of devices of that character which can be provided in accord with those principles.

It is believed that the technique employed for generating arcuate score lines with device 84 will be apparent to the reader from the foregoing detailed description of that device. Briefly, however, and assuming that device 84 is to be employed in association with pivotable glass cutter guide 56 as shown in FIG. 23, the center $C_1$ of the arc to be scored is located by pivoting glass cutter guide 56 about axis 66 and displacing bracket 86 along the guide until the desired location is reached. Then, screw 450 is tightened to lock bracket 86 to glass cutter guide 56; and the screw 262 of clamping assembly 148 (see FIGS. 11 and 12) is tightened to immobilize glass cutter guide 56. These two steps freeze the location of the center $C_1$ of the arc being scored.

Thereafter, glass cutter holder 90 is shifted along radius rod 88 until the distance $R_2$ between center $C_1$ and glass cutter wheel 481 is reached (employing either radius rod associated index 480 or a pattern transferred to the piece of glass 96 being cut). Thereafter, thumb screw 478 is tightened to lock glass cutter holder 90 in the selected position along radius rod 88; and the glass is then scored by displacing glass cutter 92 along arc 98.

Figure 14:
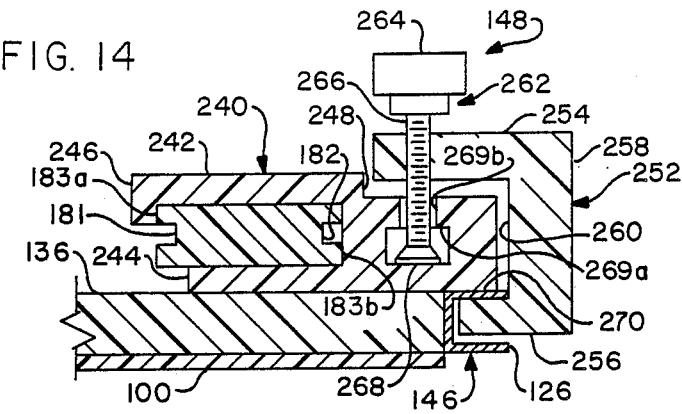
FIG. 14 is a section through FIG. 13, taken substantially along line 14—14 of the latter to show the details of the arm clamping assembly.
Figure 29:
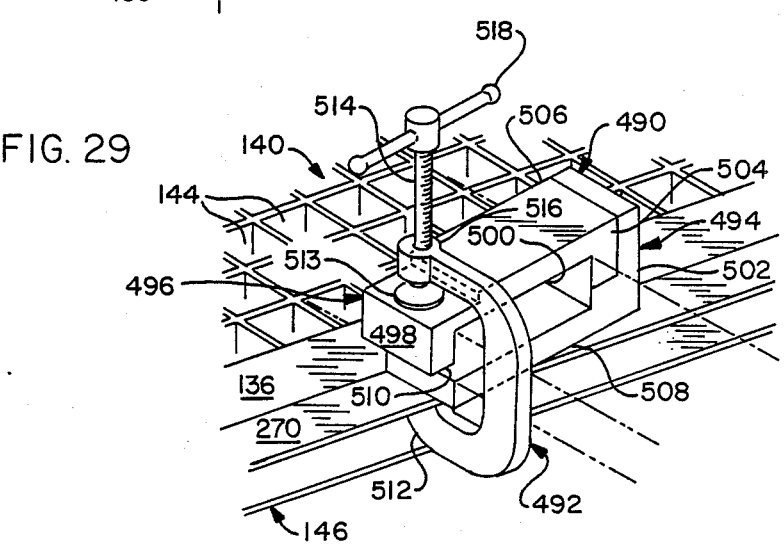
FIG. 29 is a partial perspective view of the system and accessory shown in FIG. 28.

It will be apparent to the reader, from the foregoing, that many modifications may be made in the exemplary glass scoring system 40 described above without exceeding the principles of my invention. As one, representative example, the relative complex clamping assembly 148 illustrated in FIGS. 13 and 14 and employed to immobilize pivotable glass cutter guide 56 in a selected angular position on glass scoring system base 42 is not essential. It may be replaced with the relatively simple clamp 490 illustrated in FIG. 29 and a conventional C-clamp 492.

Clamp 490 has an L-shaped base 494 and an inverted U-shaped bracket 496. One depending leg 498 of the latter is seated in a recess 500 formed in the vertically extending leg 502 of base 494. Bracket leg 498 is secured to leg 502 of base 494 in any convenient fashion.

The pivotable, glass cutter guide 56 extends through a recess in clamp 490. That recess is defined by: the vertical legs 498 and 504 of upper clamp member 496, the horizontal leg 506 of that member, and the horizontal leg 508 of L-shaped clamp base 494. The gap 510 between the depending leg 504 of upper clamp member 496 and the horizontal leg 508 of clamp base 494 allows the horizontal legs 506 and 508 of the two clamp members to be biased toward each other and against the upper and lower surfaces 184 and 186 of pivotable glass cutter guide 56. This securely fixes clamp 490 to pivotable glass cutter guide 56.

Figure 28:
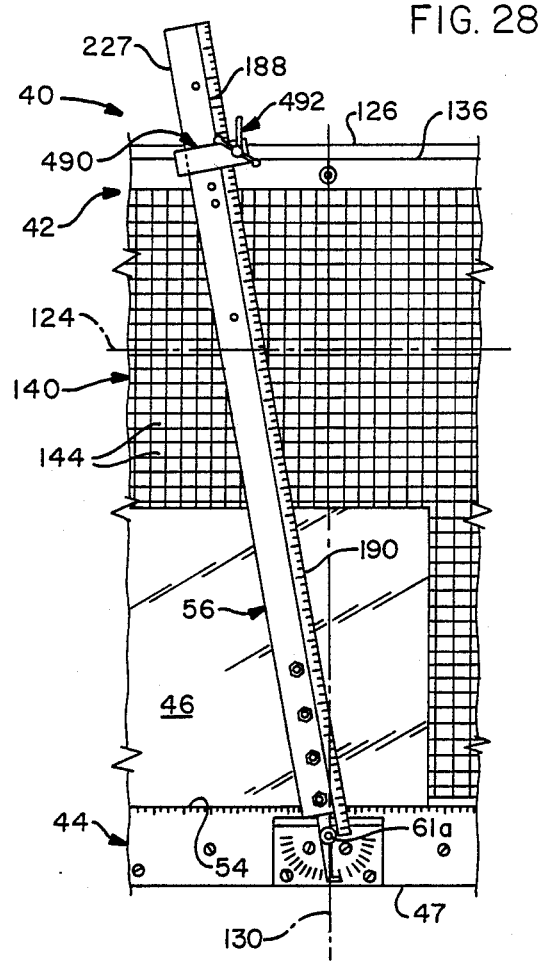
FIG. 28 is a fragmentary view of the glass scoring system illustrated in FIG. 1 showing an alternate form of clamping arrangement for locking the pivotable glass cutter guide of the system in a position intermediate one of those provided for by the locking device shown in FIG. 11.

To use clamp 490, it is installed on pivotable glass cutter guide 56 as shown in FIG. 28 and rested on the upper surface 170 of glass scoring system base 42. Guide 56 is then rotated about pivot axis 66 until the guide is positioned at the desired angle relative to the transverse midline 130 of glass scoring system 40. Next, C-clamp 492 is installed with: (1) its lower jaw 512 beneath, and engaging, the upper flange 270 of one of the three channels 145 . . . 147 extending along the side and front edges of glass scoring system base 42, and (2) the pivotable foot or pad 513 at the bottom of the C-clamp's threaded shaft 514 resting on the top of the rectilinearly displaceable clamp 490 (which will have first been slid along glass cutter guide 56 to the side or front edge of base 42). Then, the threaded shaft 514 of C-clamp 492 is rotated in upper, internally threaded C-clamp jaw 516 by turning handle 518. This clamps the rectilinearly displaceable, boxlike clamp 490 between lower jaw 512 and pad 513, securing clamp 490 and glass cutter guide 56 to the base-mounted channel—for example, the front edge-associated channel 146 depicted in FIGS. 28 and 29.

Figure 30:
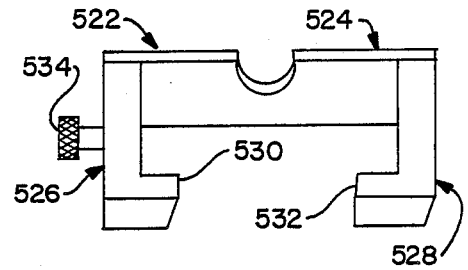
FIG. 30 is a side view of a second form of spacer which can be employed in the system of FIG. 1 to space the free end of the pivotable glass cutter guide from the base of the system.

A spacer for supporting the free or outer end 227 of pivotable glass cutting guide 56 from and above the base 42 of glass scoring system 40 was discussed above and identified by reference character 166 in FIG. 10 of the drawing. A simpler, and therefore less expensive to produce, spacer which is oftentimes an acceptable substitute for spacer 166 is illustrated in FIG. 30 and identified by reference character 522. This spacer, which may be of integral or composite construction, includes a flat upper member 524 which rests upon the upper surface 324 (see FIG. 16) of pivotable guide 56; vertically depending side members 526 and 528, which engage opposite edges 320 and 322 of the guide; and inwardly extending flanges 530 and 532 at the lower ends of side members 526 and 528. These flanges engage the lower surface 326 of guide bar so that the latter is surrounded by spacer 522 with the spacer being slidable along the guide. Flanges 530 and 532 space guide 56 above and—in cooperation with fixed fence 44—parallel to the upper surface 170 of base 42.

Spacer 522 can be locked to pivotable glass holder guide 56 at any selected location therealong by a screw 534. That screw is threaded through depending side member 526 of the spacer and is engageable with the left-hand edge 320 of guide 56.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed as my invention is:

1. A system for scoring a piece of glass along a specified line so that the glass may subsequently be broken along said line to impart a selected contour to the glass, said system comprising:
   a. a base with an exposed, horizontal surface;
   b. stop means for positioning the piece of glass to be scored on said surface of said platform;
   c. a pivotable guide which is rotatable about a pivot axis at one edge of and extending normally from said base; and
   d. a glass cutter holder displaceable to and fixable at a selected position along said guide;
   e. whereby an arc of a selected radius and with said pivot axis as a center can be scored on said piece of glass with a glass cutter mounted in said holder;
   f. said guide having an edge along which a glass cutter can be displaced to score a straight line in said piece of glass; and
   g. said system also including means for securing said pivotable glass cutter guide to said base at a selected fixed angle relative to one edge of said base so that said guide can also and alternatively be employed to score said piece of glass along a straight line oriented at said selected fixed angle.

2. A glass scoring system as defined in claim 1 which has a scale extending along said pivotable guide to locate said holder at a selected distance from said pivot axis.

3. A glass scoring system as defined in claim 1 wherein there are flange means extending along edges of said base and wherein the means for securing said pivotable glass cutter guide to said base comprises an accessory journaled on and slidable along said pivotable guide and a clamp for securing said accessory to one of said flange means.

4. A glass scoring system as defined in claim 1 wherein the means for securing said pivotable glass cutter guide to said base comprises internally threaded apertures opening onto the exposed surface of the base, through apertures spaced along said pivotable member, and a threaded fastener which can be inserted through a selected aperture in said pivotable glass cutter guide and then threaded into a corresponding aperture in said base.

5. A glass scoring system as defined in claim 1 wherein there are flange means extending along edges of said base and wherein the means for securing said pivotable glass cutter guide to said base is an assembly which includes a first component with a leg which is horizontally extendable into engagement with the lower side of one of said flange means, a second component with upper and lower members configured and dimensioned to slidingly confine said pivotable guide therebetween, and a user manipulatable member which is threaded through said first component and extends into said second component to provide a pivotable connection between said first and second components, whereby rotation of said last-mentioned member in said first component will displace said second component toward said first component to clamp said flange means therebetween, thereby fixing said assembly to said base and said pivotable guide and immobilizing said guide.

6. A glass scoring system as defined in claim 1 which has stop means at opposite ends of said base for limiting the arc through which said pivotable glass cutter guide can be swung.

7. A glass scoring system as defined in claim 1 which includes a protractor means with a scale centered on said pivot axis and wherein said pivotable glass cutter guide has a pointer aligned therewith and extending from said guide into operative relationship with the protractor scale.

8. A glass scoring system as defined in claim 1 which has a fixed, glass positioning fence at, and paralleling, that edge of the base at which said pivot axis is located 9. A glass scoring system as defined in claim 1 which includes spacer means for supporting that end of the pivotable guide remote from said pivot axis from said base in parallel relationship thereto, said accessory being configured to surround and slide along said pivotable guide and having one side adapted to face downwardly and ride upon a piece of glass being cut and a second, alternately employable side of greater thickness which is adapted to ride directly upon said base.

10. A glass scoring system as defined in claim 1 wherein said pivotable guide has grooves extending the length thereof, said grooves being formed in and opening onto the opposite edges of said guide, and wherein the cutter holder is slidable along said guide and has depending portions with inwardly facing flanges received in said longitudinally extending grooves, there being a component threaded through said holder and engageable with said guide to the clamp holder thereto and an aperture through said holder in which a glass cutter can be fitted.

11. A glass scoring system as defined in claim 1 wherein there is a scale extending along said pivotable glass cutter guide from the end thereof adjacent said pivot axis to the opposite guide end, wherein said cutter holder is slidable along said guide, and wherein there is an aperture through said cutter holder in alignment with said scale through which the scale can be viewed by the user of the glass scoring system.

12. A glass scoring system as defined in claim 1 in which said pivotable glass cutter guide is removable from said base.

13. A glass scoring system as defined in claim 1 which includes an elongated straight edge with means at the opposite ends thereof for affixing the straight edge to said base in an orientation parallel to and at a selected distance from a fixed guide extending along one edge of said base.

14. A glass scoring system as defined in claim 13 wherein there are scales at the opposite ends of said base and extending normally from said one edge thereof for precisely aligning said straight edge parallel to and at the selected distance from the fixed guide.

15. A glass scoring system as defined in claim 14 which includes a flange extending along each end of said base, a guide fixed to each end of said straight edge and extending into engagement with the lower side of said flange, and a member threaded through the straight edge and each guide and contactable with a flange to clamp said flange and the guide together and thereby immobilize the straight edge with respect to said base.

16. A glass scoring system as defined in claim 1 which further includes an elongated fence for positioning said glass at a location removed from said one edge of said base, said fence having means toward the opposite ends thereof for locating it parallel to said one edge of said base, at a selected distance from that edge, and in a specified location between the ends of the base, 17. A glass scoring system as defined in claim 16 wherein there is a set of adjoining, like dimensioned apertures opening onto and spanning the upper surface of said base, wherein there is a longitudinally extending, elongated slot in said guide at each end thereof; and wherein the means for securing said guide to said base includes, at each end of the guide: a lug dimensioned to snugly fit within a selected one of the upwardly opening apertures in said base and fastener means extending through the slot in said guide and threaded into said lug and thereby tightenable to clamp said end of said guide against said base.

18. A system for scoring a piece of glass along a specified line so that the glass may subsequently be broken along said line to impart a selected contour to the glass, said system comprising:
    a. a base with an exposed, horizontal surface;
    b. stop means for positioning the piece of glass to be scored on said surface of said platform;
    c. a glass cutter guide;
    d. said base including a component providing a set of adjoining, upwardly opening, square-sectioned cells of like dimension; and
    e. said glass positioning stop means including a main body member with means for engaging the piece of glass being scored and an elongated, longitudinally extending slot, a lug which can be installed in any one of the cells in said base component, and a threaded fastener which extends through said slot and into an internally threaded aperture in said lug, whereby said main body member can be rotated and rectilinearly displaced relative to said base to juxtapose said glass engaging means with the glass being scored and said fastener can thereafter be tightened to clamp said main body member against said base component with said piece of glass in a fixed orientation relative thereto and at a selected location therealong.

19. A glass scoring system as defined in claim 18 in which said stop means has a V-shaped notch formed in one end of the main body member thereof to provide the glass engaging means.

20. A glass scoring system as defined in claim 18 wherein the main body member of the stop means has a convex, glass engageable configuration, there also being a concave recess in said main body portion providing spaced apart tips for engaging the glass being scored.

21. A glass scoring system as defined in claim 18 wherein said main body member of said stop means has two elongated, longitudinally spaced slots therein and wherein the stop means includes a second lug and means extending through the second of the elongated slots in the main body member of the stop means for aligning one end of said stop means parallel or at a right angle relative to said one edge of said base.

22. A system for scoring a piece of glass along a specified line so that the glass may subsequently be broken along said line to impart a selected contour to the glass, said system comprising:
    a. a base with an exposed, horizontal surface;
    b. stop means for positioning the piece of glass to be scored on said surface of said platform;
    c. a pivotable guide which is rotatable about a pivot axis at one edge of said base;
    d. a support means slidable along and lockable in fixed relationship to said pivotable guide;

e. an elongated arm fixed at one end thereof to said support means for rotation about a second pivot axis extending normal to said base; and f. a glass cutter holder slidable along and lockable to said arm;

g. whereby: (1) by sliding said support means along said guide and rotating said guide about the first-mentioned pivot axis, said second pivot axis can be positioned at a specified location on said base, and (2) by displacing said glass cutter holder to an appropriate location along said elongated arm and there locking it to said arm, an arc of selected dimension and with said second axis as its center can be scored on a piece of glass supported on said base.

23. A glass scoring system as defined in claim 22 which comprises means for fixing said one end of said elongated arm to said support means for rotation about a transverse, horizontal axis so that a cutter secured to said holder can be lifted away from a piece of glass supported on said base.

24. A system for scoring a piece of glass along a specified line so that the glass may subsequently be broken along said line to impart a selected contour to the glass, said system comprising:

a. a base with an exposed, horizontal surface;

b. stop means for positioning the piece of glass to be scored on said surface of said base; and c. means for guiding a glass cutter along said piece of glass at a selectable distance from and parallel to said one edge of said base so that said glass can be scored along a line parallel to said one edge of said base and a strip of uniform width with parallel edges subsequently broken from said piece of glass, said guide means including an elongated straight edge extending from edge-to-edge of said base and having means at the opposite ends thereof for affixing the straight edge to opposite edges of said base in an orientation parallel to and at a selected distance from said one edge of said base.

25. A glass scoring system as defined in claim 24 wherein there are scales at the opposite ends of said base and extending normally from said one edge thereof for precisely aligning said straight edge parallel to and at the selected distance from the fixed guide.

26. A glass scoring system as defined in claim 24 which includes flange means extending along each end of said base, a guide fixed to each end of said straight edge and extending into engagement with the bottom side of said flange means, and a member threaded through the straight edge and each guide and contactable with said flange means to clamp said flange means and the guide together and thereby immobilize the straight edge with respect to said base.

27. A system for scoring a piece of glass along a specified line so that the glass may subsequently be broken along said line to impart a selected contour to said glass, said system comprising:

a. a base with an exposed, horizontal surface; and b. means for positioning said glass on said base at a selected distance from said one edge thereof which includes: an elongated alignment guide with means toward the opposite ends thereof for locating said guide on said base parallel to said one edge of said base, at the selected distance from that edge, and in a specified location between the ends of the base;

c. there being a set of adjoining, similarly dimensioned apertures opening upwardly onto the surface of the base;

d. there also being an elongated slot in said guide at each end thereof which is oriented normally to said one edge of said base; and e. the means for securing said guide to said base including, at end of the guide; a lug dimensioned to snugly fit within a selected one of the upwardly opening apertures in said base and fastener means extending through the slot in that end of said guide and threaded into said lug and thereby tightenable to clamp said end of said alignment guide against said base after said ends have been adjusted relative to said fasteners to precisely position said alignment guide relative to said base.

* * * * *